United States Patent
Kress (10) Patent No.: US 7,518,752 B2
(45) Date of Patent: Apr. 14, 2009

(54) SYSTEM AND METHOD FOR TWO COLOR DOCUMENT RENDERING

(75) Inventor: William C. Kress, Mission Viejo, CA (US)

(73) Assignees: Toshiba Corporation (JP); Toshiba Tec Kabushiki Kaisha (JP)

(*) Notice: Subject to any disclaimer, the term of this patent is extended or adjusted under 35 U.S.C. 154(b) by 122 days.

(21) Appl. No.: 11/452,872

(22) Filed: Jun. 14, 2006

(65) Prior Publication Data

US 2008/0123144 A1    May 29, 2008

(51) Int. Cl.
- *G06F 15/00* (2006.01)
- *G06K 1/00* (2006.01)
- *H04N 1/60* (2006.01)
- *G06F 3/08* (2006.01)

(52) U.S. Cl. .............................. 358/1.9; 358/520

(58) Field of Classification Search ............... 382/167; 358/523, 1.9, 3.1, 509, 518, 520
See application file for complete search history.

(56) References Cited

U.S. PATENT DOCUMENTS

| | | | | |
|---|---|---|---|---|
| 5,680,230 | A | * | 10/1997 | Kaburagi et al. ............ 358/520 |
| 5,835,244 | A | * | 11/1998 | Bestmann .................... 358/523 |
| 6,868,179 | B2 | * | 3/2005 | Gruzdev et al. ............. 382/167 |
| 2003/0002060 | A1 | * | 1/2003 | Yokoyama et al. ........... 358/1.9 |

* cited by examiner

*Primary Examiner*—Douglas Q Tran
(74) *Attorney, Agent, or Firm*—Tucker Ellis & West LLP (57) ABSTRACT

A system and method for converting an image to a constrained color palette representation receives a specified color or hue from which an image is to be defined. A conversion is then made from an input color space to a CIELAB representation. Data is converted in CIELAB space, in accordance with a specified hue, to a color space set by the specified color. Once converted, data is converted to a color space corresponding to that of an associated document rendering device.

15 Claims, 6 Drawing Sheets

SYSTEM AND METHOD FOR TWO COLOR DOCUMENT RENDERING

BACKGROUND OF THE INVENTION

This invention is directed to a system and method to generate a two color rendering of images, such as images which use a single color hue, which is not black. The system is particularly advantageous in connection with obtaining printouts of two color images which are used to give a desired effect or look. However, it is to be appreciated that the disclosed system is advantageously employed in any electronic document rendering system in which a simple and effective mechanism for constrained color rendering is desirable.

Typically, image data is encoded into a form wherein color is represented by values in a selected color space. For example, common encoding is done in a primary color space, which is suitably additive, such as red, green, blue ("RGB") or subtractive, such as cyan, magenta, yellow ("CYM"), the latter of which is often coupled with black ("K"), resulting in CYMK or alternatively, CYM(K). Sometimes, for effect, it is desirable to render images with a limited color palette. In the case where an image is rendered with a dominant hue, it is referred to as two color, bi-color, bi-chromatic or twin color mode, which are understood hereinafter to reflect the function of the subject teachings. Two color rendering is suitably defined as generating an image with a single, non-black hue.

There is a need for an effective mechanism to achieve two color printing from color printers, particularly in connection with prints obtained from multi-function peripherals. This requires a mechanism that allows for derivation of two color rendition using conventional hardware available on document output devices.

SUMMARY OF THE INVENTION

In accordance with the subject application, there is provided a system and method to achieve two color printing from color printers.

Further, in accordance with the subject application, there is provided a system and method that allows for derivation of two color rendition using conventional hardware available on document output devices.

Still further, in accordance with the subject application, there is provided a system and method for generating a document output in two color mode. Electronic document data defining an image is received, which electronic document data includes color data having values defined in a selected, multidimensional color space, the color data including luminance data and saturation data. Color data is then mapped to a selected color component of the multidimensional color space so as to generate color data corresponding to a limited or constrained color palette, such as a two color representation of the image, which two color representation substantially maintains the luminance data and saturation data of the received electronic document data. The converted data is then communicated to an associated document rendering device.

In accordance with a more limited aspect of the subject application, the system and method further allow for receipt of data identifying the selected color with which the two color rendering is to be made.

In accordance with another aspect of the subject application, color data is mapped to the selected color component relative to a selected offset value there between.

In accordance with still another aspect of the subject application, a conversion is made of data from a first color space to a second color space prior to being output to the associated document rendering device.

In accordance with a still more limited aspect of the subject application, electronic document data is converted from a RGB color space representation to a CIELAB, or L*a*b* color space representation. Values for c*, a* and b* are calculated in accordance with L*a*b* color space representation and the selected component. A modified L*a*b* color space representation is then calculated in accordance with a luminance values, L* and chroma values, c*, in concert with the selected component. Then, the calculated bi-chromatic L*a*b* color representation is converted to bi-chromatic data defined in a color space compatible with the associated document rendering device.

An advantage of the subject application is the provision of a constrained palette image rendering system that is simple to realize with conventional hardware.

Yet another advantage of the subject application is the provision of a constrained palette image rendering system that is selectable over different colors for rendering.

Still another advantage of the subject application is the provision of a constrained palette image rendering system that is readily adaptable to conventional color encoding schemes associated with electronic image data.

Still other advantages of the subject application will become readily apparent to those skilled in this art from the following description wherein there is shown and described a preferred embodiment of this invention, simply by way of illustration of one of the best modes suited to carry out the invention. It will be realized, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the subject application, and together with the description serve to explain the principles of the invention. In the drawings.

DETAILED DESCRIPTION OF THE PREFERRED EMBODIMENT

This invention is directed to a system and method for producing an electronic document or image using a single, non-black hue. This non-black hue is combined with another color, black in the preferred embodiment, to accomplish the bi-chromatic rendering described herein. In particular, the subject application is directed to a system and method to achieve two color printing from color printers. More particularly, the subject application is directed to a system and method that allows for derivation of two color rendition using conventional hardware available on document output devices.

Figure 1:
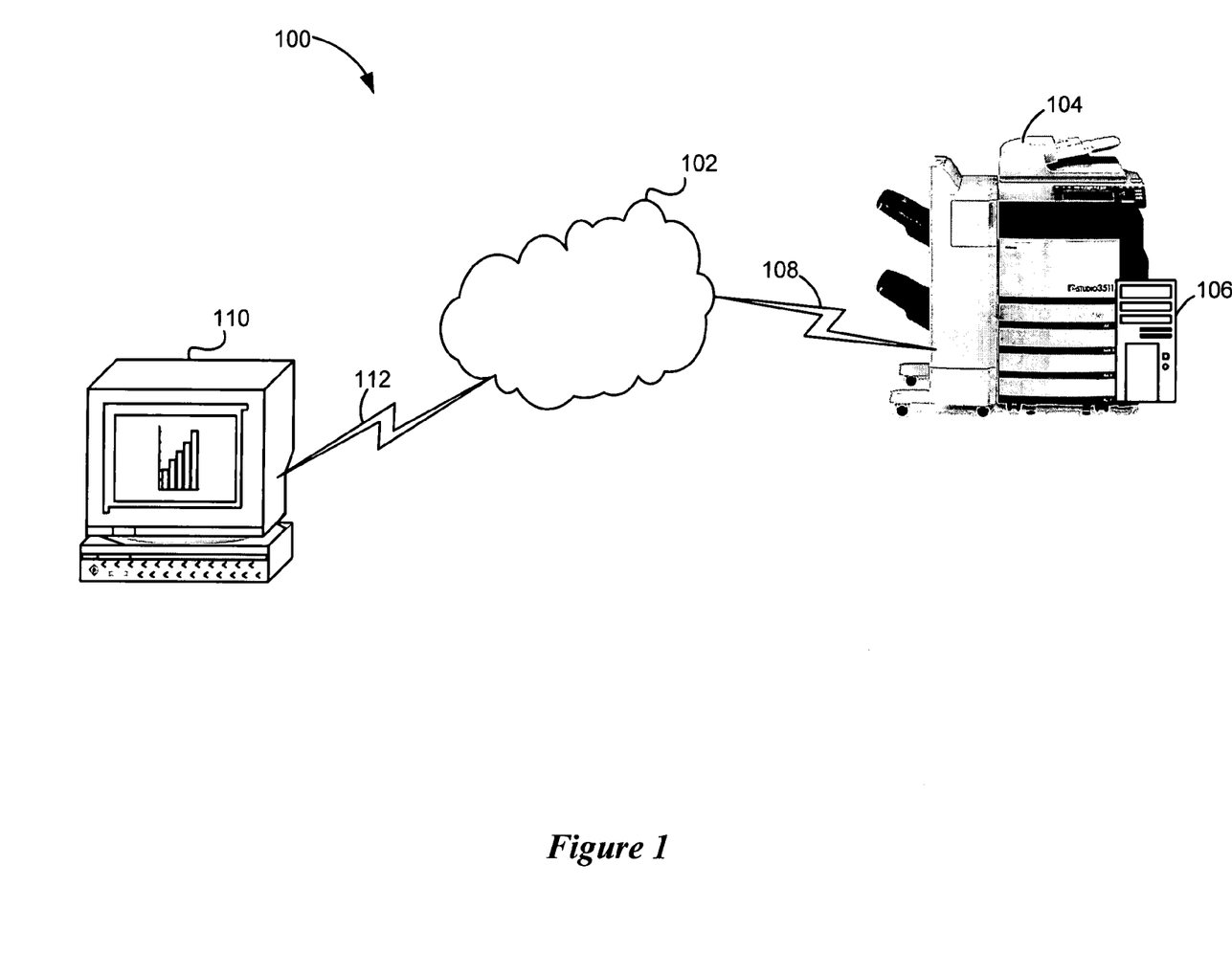
FIG. 1 is a block diagram of the system according to the subject application.

Turning first to FIG. 1, there is shown a block diagram illustrating a document rendering system 100 in accordance with the subject application. As shown in FIG. 1, the system 100 employs a distributed computing environment, represented as a computer network 102. It will be appreciated by those skilled in the art that the computer network 102 is any distributed communications environment known in the art capable of enabling the exchange of data between two or more electronic devices. Those skilled in the art will further appreciate that the network 102 is any computer network known in the art including, for example and without limitation, a virtual area network, a local area network, a personal area network, the Internet, an intranet, a wide area network, or any suitable combination thereof. Preferably, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms.

The system 100 depicted in FIG. 1 further includes a document processing device 104, represented as a multifunction peripheral device, suitably adapted to perform a variety of document processing operations. The skilled artisan will understand that such document processing operations include, for example and without limitation, copying, scanning, electronic mail, document management, facsimile, printing, and the like. Suitable commercially available document processing devices include, but are not limited to, the Toshiba e-Studio Series Controller. In one embodiment, the document processing device 104 is suitably equipped to receive a plurality of portable storage media, including without limitation, Firewire drive, USB drive, SD, MMC, XD, Compact Flash, Memory Stick, and the like. In the preferred embodiment of the present invention, the document processing device 104 further includes an associated user-interface, such as a touch-screen interface, an alpha-numeric interface, an LCD display, or the like, via which an associated user is able to interact directly with the document processing device 104.

In accordance with the subject application, the document processing device 104 further incorporates a controller 106, suitably adapted to facilitate the operations of the document processing device 104, as will be understood by those skilled in the art. Preferably, the controller 106 is embodied as hardware, software, or any suitable combination thereof, configured to control the operations of the associated document processing device 104, control the display of images via the user-interface, perform color processing operations, and the like. It is readily understood that the controller functions to receive electronic document information and process it so as to result in a display or output of an image. A suitable output is realized from a printer, and more particularly a color printer in the subject application. It will be appreciated that any color rendering device, such as a color facsimile, dot matrix printer, laser printer and the like is contemplated herein. The skilled artisan will appreciate that while the controller 106 is depicted in FIG. 1 as being external to the document processing device 104, the subject application is capable of incorporating the controller 106 internally to the document processing device 104 via any suitable means known in the art. The functioning of the controller 108 will better be understood in conjunction with the block diagrams illustrated in FIGS. 2 and 3, explained in greater detail below.

Preferably, the first document processing device 104 is communicatively coupled to the computer network via a suitable communications link 108. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In addition to the foregoing, the system 100 further includes at least one client device 110, illustrated in FIG. 1 as a computer workstation for illustration purposes only. As the skilled artisan will appreciate, the client device 110 is representative of any personal computing device known in the art, including, for example and without limitation, a personal computer, a laptop computer, a personal data assistant, a proprietary networked portable electronic device, a web-enabled cellular telephone, a smart phone, or other web-enabled electronic device suitably capable of electronic communications. Communication between the client device 110 and the computer network 102 is advantageously accomplished via a communications link 112. The communications link 112 is any suitable channel of data communications known in the art, including, but not limited to, wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art.

Figure 2:
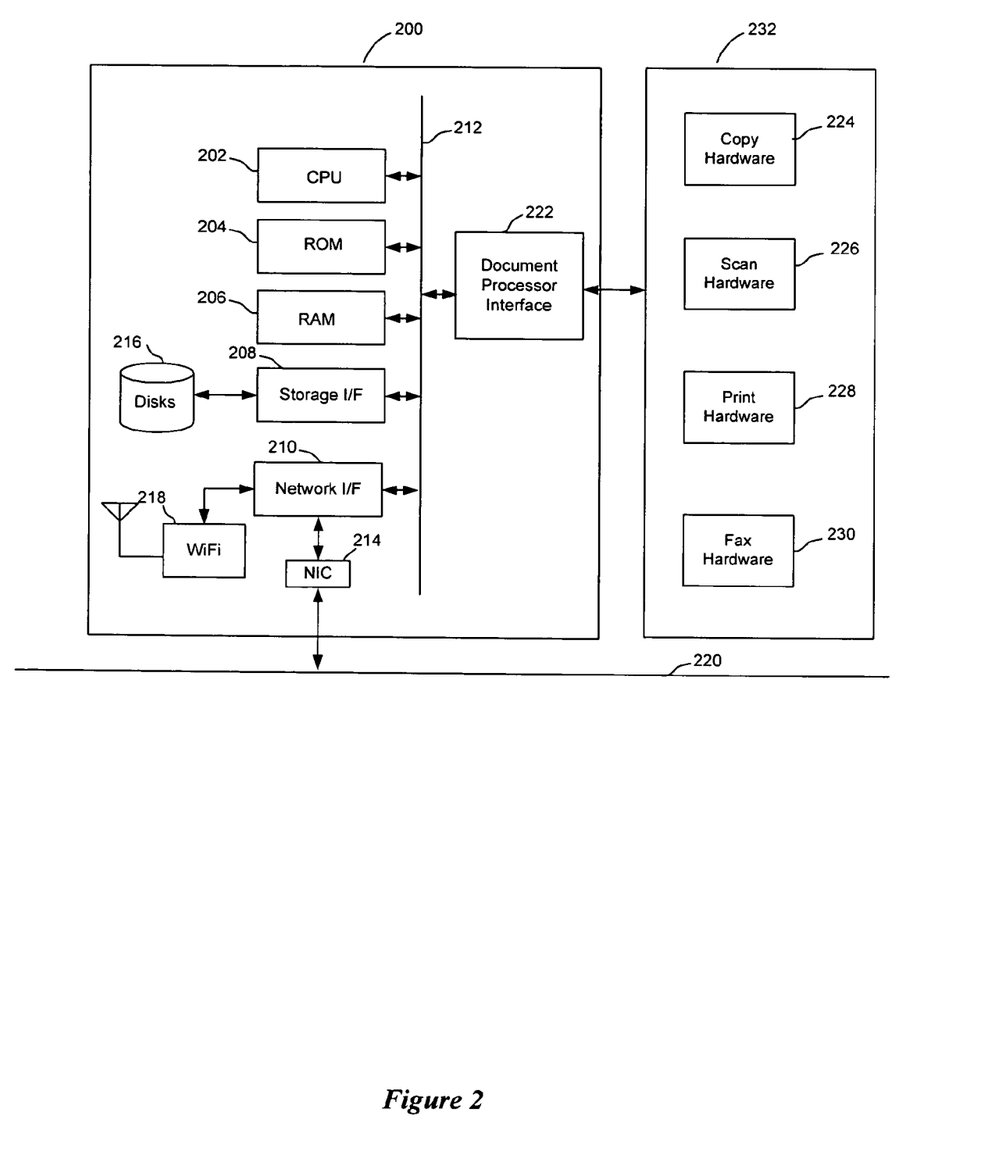
FIG. 2 is a block diagram illustrating controller hardware for use in the system according to the subject application.

Turning now to FIG. 2, illustrated is a representative architecture of a suitable controller 200, shown as the controller 106 in FIG. 1, on which operations of the subject system 100 are completed. Included is a processor 202, suitably comprised of a central processor unit. However, it will be appreciated that processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the controller 200.

Also included in the controller 200 is random access memory 206, suitably formed of dynamic random access memory, static random access memory, or any other suitable, addressable and writable memory system. Random access memory provides a storage area for data instructions associated with applications and data handling accomplished by processor 202.

A storage interface 208 suitably provides a mechanism for non-volatile, bulk or long term storage of data associated with the controller 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the controller 200 to communicate to other devices. Network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 214 is interconnected for data interchange via a physical network 220, suitably comprised of a local area network, wide area network, or a combination thereof.

Data communication between the processor 202, read only memory 204, random access memory 206, storage interface 208 and network interface subsystem 210 is suitably accomplished via a bus data transfer mechanism, such as illustrated by bus 212.

Also in data communication with the bus 212 is a document processor interface 222. The document processor interface 222 suitably provides connection with hardware 232 to perform one or more document processing operations. Such operations include copying accomplished via copy hardware 224, scanning accomplished via scan hardware 226, printing accomplished via print hardware 228, and facsimile communication accomplished via facsimile hardware 230. It is to be appreciated that the controller 200 suitably operates any or all of the aforementioned document processing operations. Systems accomplishing more than one document processing operation are commonly referred to as multifunction peripherals or multifunction devices.

Figure 3:
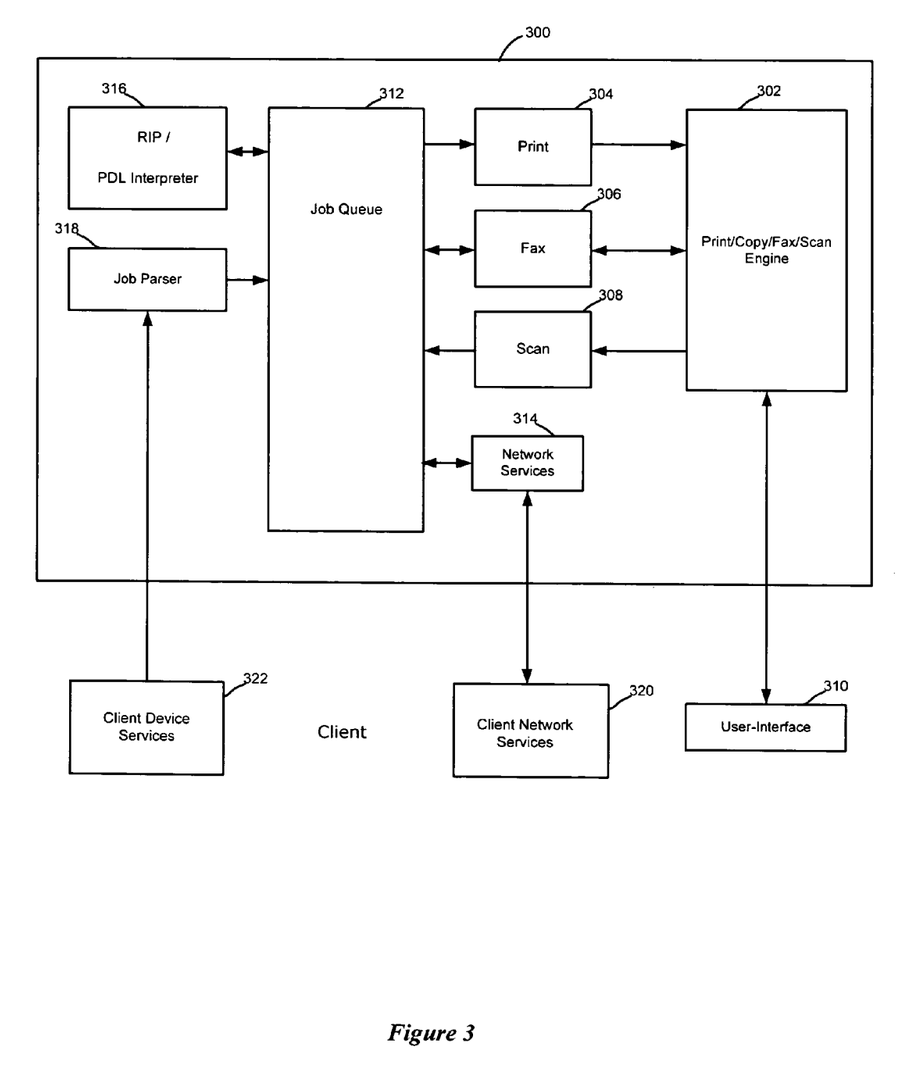
FIG. 3 is a functional block diagram illustrating the controller for use in the system according to the subject application.

Functionality of the subject system is accomplished on a suitable document processing device that includes the controller 200 of FIG. 2 as an intelligent subsystem associated with the document processing device 104. In the illustration of FIG. 3, controller function 300 in the preferred embodiment, includes a document processing engine 302. A suitable controller functionality is that incorporated into the Toshiba e-Studio system in the preferred embodiment. FIG. 3 illustrates suitable functionality of the hardware of FIG. 2 in connection with software and operating system functionality as will be appreciated by one of ordinary skill in the art.

In the preferred embodiment, the engine 302 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that are subset of the document processing operations listed above.

The engine 302 is suitably interfaced to a user interface panel 310, which panel allows for a user or administrator to access functionality controlled by the engine 302. Access is suitably via an interface local to the controller, or remotely via a remote thin or thick client.

The engine 302 is in data communication with printer function 304, facsimile function 306, and scan function 308. These devices facilitate the actual operation of printing, facsimile transmission and reception, and document scanning for use in securing document images for copying or generating electronic versions.

A job queue 312 is suitably in data communication with printer function 304, facsimile function 306, and scan function 308. It will be appreciated that various image forms, such as bit map, page description language or vector format, and the like, are suitably relayed from scan function 308 for subsequent handling via job queue 312.

The job queue 312 is also in data communication with network services 314. In a preferred embodiment, job control, status data, or electronic document data is exchanged between job queue 312 and network services 314. Thus, suitable interface is provided for network based access to the controller 300 via client side network services 320, which is any suitable thin or thick client. In the preferred embodiment, the web services access is suitably accomplished via a hypertext transfer protocol, file transfer protocol, uniform data diagram protocol, or any other suitable exchange mechanism. Network services 314 also advantageously supplies data interchange with client side services 320 for communication via FTP, electronic mail, TELNET, or the like. Thus, the controller function 300 facilitates output or receipt of electronic document and user information via various network access mechanisms.

Job queue 312 is also advantageously placed in data communication with an image processor 316. Image processor 316 is suitably a raster image process, page description language interpreter or any suitable mechanism for interchange of an electronic document to a format better suited for interchange with device services such as printing 304, facsimile 306 or scanning 308.

Finally, job queue 312 is in data communication with a parser 318, which parser suitably functions to receive print job language files from an external device, such as client device services 322. Client device services 322 suitably include printing, facsimile transmission, or other suitable input of an electronic document for which handling by the controller function 300 is advantageous. Parser 318 functions to interpret a received electronic document file and relay it to a job queue 312 for handling in connection with the aforedescribed functionality and components.

In operation, the controller 106 associated with the document processing device 104 receives an electronic document containing color image data via any suitable means. The skilled artisan will appreciate that such an electronic document is capable of originating from the client device 110, transmitted via the computer network 102, a color hardcopy received directly at the document processing device 104, or the like. The document is then analyzed and the color data associated with the color image, including luminance data and saturation data, is retrieved by the controller 106. A color component is then selected and received by the controller 106. Preferably, a user associated with the electronic document selects a particular color component. In accordance with one embodiment of the subject application, the selected color component is predetermined based upon the capabilities of the document processing device 104, various toner levels associated therewith, a preprogrammed color selection contained in the controller 106, or other suitable means known in the art.

The controller 106 then converts the RGB color data to L*a*b* color data via a suitable conversion methodology, which is explained in greater detail below with respect to FIG. 5. Next, c*, a*, and b* values are calculated by the controller 106 in accordance with the CIEL*a*b* representation from the selected color component. A bi-chromatic L*a*b* representation is then calculated by the controller 106 in accordance with the L* values and c* values at an appropriate hue. The calculated bi-chromatic L*a*b* color representation is then converted to bi-chromatic data defined in a device compatible color space via the controller 106. Such conversion is suitably accomplished with a device link profile, which functions to map between color values of input and output color spaces. The skilled artisan will appreciate that any suitable color space, depending upon the color space supported by the document processing device 104, is capable of being used in accordance with the subject application. The bi-chromatic data in the device compatible color space is then transferred from the processing resources of the controller 106 to the rendering device associated with the document processing device 104. The document processing device 104, via the rendering component thereof, then outputs the bi-chromatic image.

Figure 4:
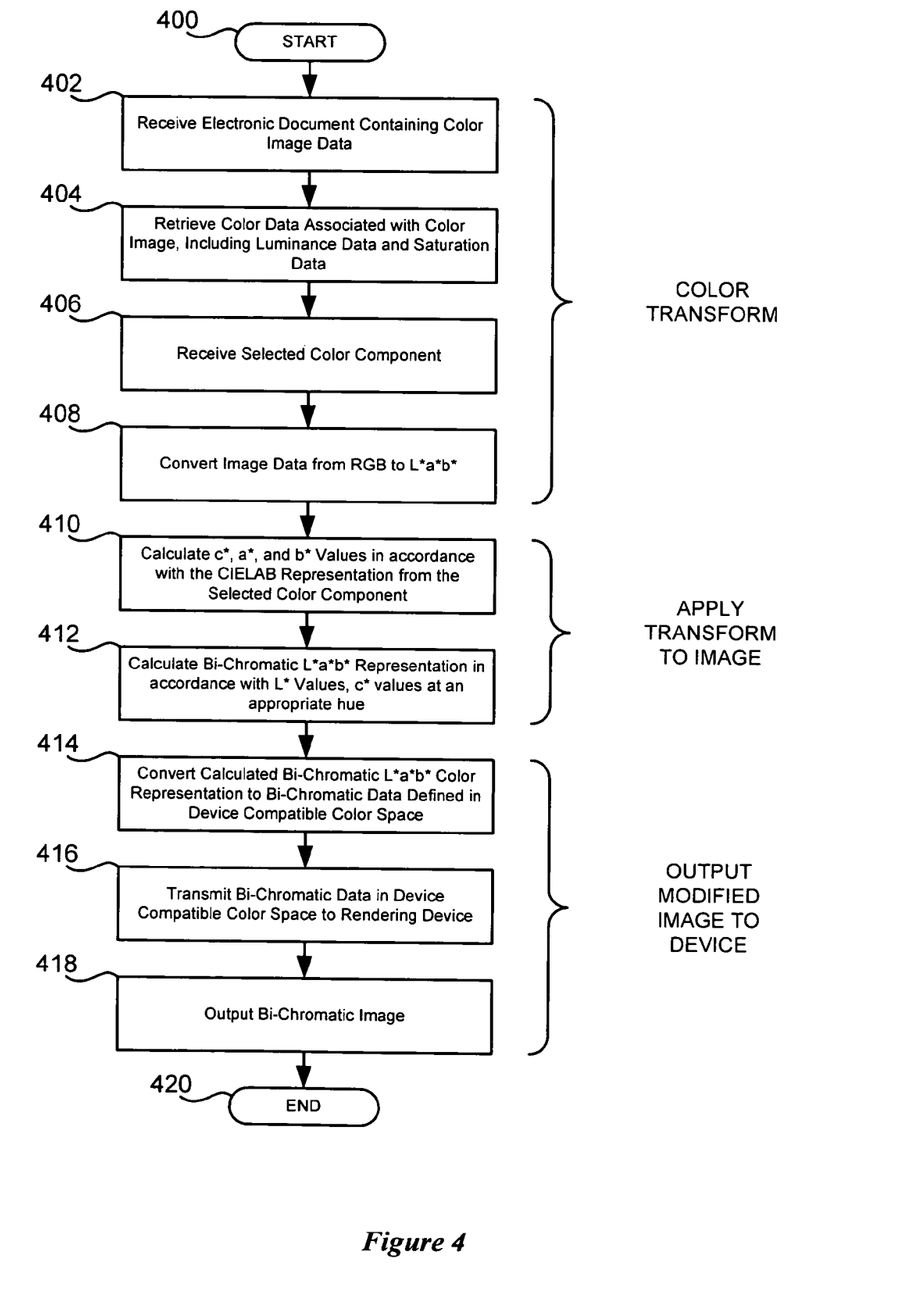
FIG. 4 is a flowchart of a system of bi-chromatic image rendering according to the subject application.
Figure 5:
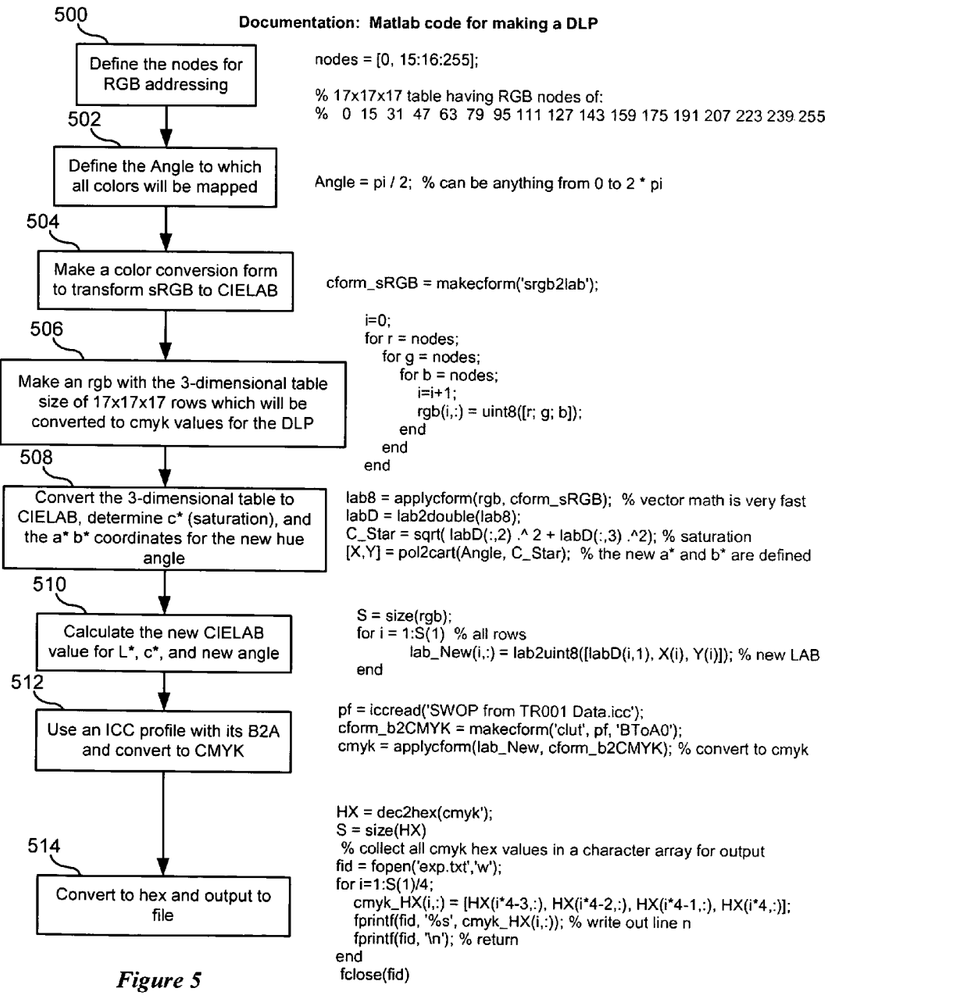
FIG. 5 is a flowchart, and representative MATLAB encoding, illustrating a system for bi-chromatic data rendering according to the subject application.

The foregoing system 100 and various components illustrated in FIGS. 1, 2, and 3 will be better understood when viewed in conjunction with the methodologies described in FIG. 4 and FIG. 5. Turning to FIG. 4, illustrated is a flowchart for the basic hue transformation of the subject application. The flowchart of FIG. 4 is illustrated in connection with extraction of bi-chromatic data, that is to say two color rendering. It will be appreciated that the subject output once rendered will be weighted towards a selected color. The skilled artisan will further appreciate, however, that additional colors, such as inks, will be required to generate the resultant image. On a multicolored document rendering device, capable of producing most visible colors, it is to be appreciated that even a constrained or limited hue rendering may in fact have some non-dominant component contributed by other additive or subtractive primaries. The illustration of FIG. 4 is a flowchart showing a two color or bi-chromatic transform in connection with the subject application.

The transform system of FIG. 4 commences at block 400. Next, at block 402, electronic document data is received. This electronic document data includes color information encoded in a selected color space, such as a primary color space as shown at block 404. In the embodiment of FIG. 4, an additive red, green, blue ("RGB") color space is used insofar as such encoding is commonly used in electronic document formats. Next, at block 406, input or selection relative to a selected color component for the transformation is received. This color component will dictate the hue of the final image.

Turning next to block 408, the input image is converted from RGB space to CIELAB space. The concepts disclosed herein are better appreciated with an understanding of numeric models used to represent images, and image colorization, in image processing or rendering applications. CIE L*a*b* (CIELAB or Lab) is frequently thought of one of the most complete color models. It is used conventionally to describe all the colors visible to the human eye. It was developed for this specific purpose by the International Commission on Illumination (Commission Internationale d'Eclairage, resulting in the acronym CIE). The three parameters (L, a, b) in the model represent the luminance of the color (L, L=0 yields black and L=100 indicates white), its position between red and green (a, negative values indicate green, while positive values indicate red) and its position between yellow and blue (b, negative values indicate blue and positive values indicate yellow).

The Lab color model has been created to serve as a device independent reference model. It is therefore important to realize that visual representations of the full gamut of colors in this model are not perfectly accurate, but are used to conceptualize a color space. Since the Lab model is three dimensional, it is represented properly in a three dimensional space. A useful feature of the model is that the first parameter is extremely intuitive: changing its value is like changing the brightness setting in a TV set. Therefore only a few representations of some horizontal "slices" in the model are enough to conceptually visualize the whole gamut, wherein the luminance is suitably represented on a vertical axis.

The Lab model is inherently parameterized correctly. Accordingly, no specific color spaces based on this model are required. CIE 1976 L*a*b* mode is based directly on the CIE 1931 XYZ color space, which sought to define perceptibility of color differences. Circular representations in Lab space corresponded to ellipses in XYZ space. Non-linear relations for L*, a*, and b* are related to a cube root, and are intended to mimic the logarithmic response of the eye. Coloring information is referred to the color of the white point of the system.

One of the first mathematically defined color spaces was the CIE XYZ color space (also known as CIE 1931 color space), created by CIE in 1931. A human eye has receptors for short (S), middle (M), and long (L) wavelengths, also known as blue, green, and red receptors. One need only generate three parameters to describe a color sensation. A specific method for associating three numbers (or tristimulus values) with each color is called a color space, of which the CIE XYZ color space is one of many such spaces. The CIE XYZ color space is based on direct measurements of the human eye, and serves as the basis from which many other color spaces are defined.

In the CIE XYZ color space, tristimulus values are not the S, M and L stimuli of the human eye, but rather a set of tristimulus values called X, Y, and Z, which are also roughly red, green and blue, respectively. Two light sources may be made up of different mixtures of various colors, and yet have the same color (metamerism). If two light sources have the same apparent color, then they will have the same tristimulus values irrespective of what mixture of light was used to produce them. The subject system advantageously uses the CIELAB color space in connection with accomplishing bi-chromatic image rendering.

Next, at block 410, a calculation is made of c*, a* and b* values in accordance with the L*a*b* representation and the selected color component. At block 412, a calculation is made as to bi-chromatic L*a*b* in accordance with the L* (luminance) values and c* (chroma) values as well as the selected color component. Next, at block 414, a conversion is made between bi-chromatic L*a*b* color representation to a bi-chromatic data set defined in a device compatible color space. That is to say, devices currently using subtractive primaries, such as CMYK primaries, for their input. Conversion to such a device appropriate input is suitably completed at block 414. This information is then communicated to an associated, compatible rendering device in block 416 so as to result in an output bi-chromatic image, corresponding to the selected color component, in block 418. The process is then ended at block 420.

Turning now to FIG. 5, a sample conversion for generating true color output for an associated image will be described. It will be appreciated that the subject system suitably operates on the controller 106, (FIG. 1). However, it will also be appreciated that any suitable computer, such as workstation 102, may also be used to accomplish the subject conversion. The description of FIG. 5 is included in flowchart form, along with a representative coding done in MATLAB language for illustrative purposes. The MATLAB encoding is for purposes of illustrating a representative embodiment only. The process of FIG. 5 commences at block 500. The system of the example functions to generate a colored device link profile, which device link profile is suitably a table that maps inputs to device outputs. Next, at block 502, a value of a selected color component is specified in accordance with an angle, suitably defined against which all colors will be mapped. A choice of angle which is suitably in the range of 0 to $2\pi$, or a full circle. All CIELAB numbers which are suitably input are converted to a* and b* values at such a specified angle while maintaining the luminance or L* value.

Next, at block 504, a transform is made from a color space in an input red green blue format ("sRGB") to CIELAB format. In a suitable 8-bit color encoding, 256 values (0-255)

are used for each RGB value. Next, at block 506, the RGB image is represented in a specified array of values. By way of example, the illustrated embodiment uses a 17×17×17 array. This array thus forms a three dimensional lookup table associated with a transformation from RGB to CMYK space. Iteratively, for each value of the lookup table, a CIELAB value is calculated for each RGB node using the sRGB definition. It is to be appreciated, however, that such a conversion is suitably generalized to any color form as will be appreciated by one of ordinary skill in the art. By way of example, other RGB spaces, such as AdobeRGB and ProPhotoRGB are suitably used to define CIELAB values for an input RGB image.

At block 508, new CIELAB values are converted for the L* and c* used at the specified angle. These values are calculated as a length of a diagonal between the L* access and the a* b* values. By way of example, if the subject angle is selected to be π/5 which is defined as a red area, an angle is defined by the user and the value c* and an associated saturation variable. These two values define a desirable color in polar luminance coordinate form. New CIELAB values are thus calculated, the old value L* is retained, thereby defining the color that is desired.

Next, at block 512, a suitable ICC profile is used for conversion of the image to CMYK space. Finally, at block 514, this value is suitably converted to a hexadecimal representation and output to a file or document rendering device.

In accordance with the foregoing, it will be appreciated that a user need only select an offset angle for mapping to a desired hue. The subject system iteratively converts this information accordingly providing the associated color.

Figure 6:
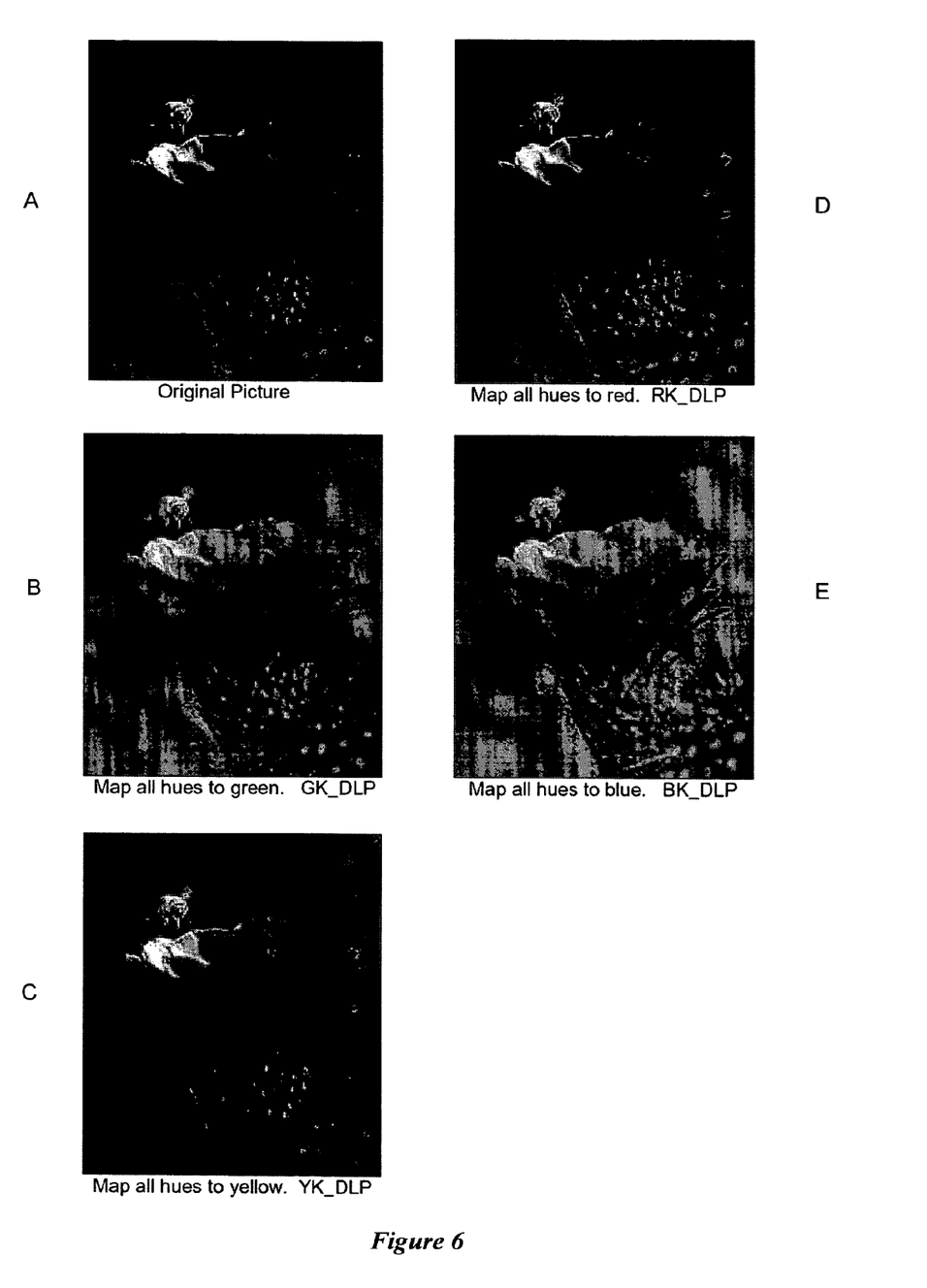
FIG. 6 illustrates an original color image and four representative mappings to green, yellow, red and blue hues in accordance with the subject application.

Turning to FIGS. 6A to 6E, representative images showing the system are provided. FIG. 6A shows an original color rendering. FIG. 6B shows that same image being mapped to a red hue, such as would be expected with a π/5 angle selected as noted in the example above. FIG. 6C shows a rendering with a mapping to a green value. FIGS. 6D and 6E show mappings to blue and yellow values, respectively.

Accordingly, the subject application teaches a system by which selected visual effects may be accomplished efficiently and accurately to a selected hue. When this feature is added to a coloring system, image rendering system, application or the like, a user is provided with a system for easy adjustment of pictures to obtain a desired effect.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A system for bi-chromatic document rendering comprising:
input means adapted for receiving electronic document data defining an image, which electronic document data includes color data having values defined in a selected, multidimensional color space, the color data including luminance data and saturation data;
mapping means adapted for mapping color data to a selected color component of the multidimensional color space so as to generate bi-chromatic data corresponding to a bi-chromatic representation of the image, which bi-chromatic representation includes a black component and a single significant, non-black hue component, and which bi-chromatic representation substantially maintains the luminance data and saturation data of the received electronic document data, the mapping means including,
means adapted for receiving angle data corresponding to an angle,
means adapted for calculating updated saturation data in accordance with received angle data,
means adapted for calculating hue value data in accordance with the non-black hue component and the received angle data, and
means adapted for generating the bi-chromatic data in accordance with the updated saturation data, the hue value, and the luminance data; and
output means adapted for communicating generated bi-chromatic data to an associated document rendering device.

2. The system for bi-chromatic document rendering of claim 1 further comprising means adapted for receiving data identifying the selected color.

3. The system for bi-chromatic document rendering of claim 2 wherein the mapping means includes means adapted for mapping color data to the selected color component relative to a selected offset value there between.

4. The system for bi-chromatic document rendering of claim 3 further comprising color converter means adapted for converting of bi-chromatic data from a first color space to a second color space prior to being output to the associated document rendering device.

5. The system for bi-chromatic document rendering of claim 3 wherein the mapping means includes:
means adapted for converting electronic document data from a RGB color space representation to a L*a*b* color space representation;
means adapted for calculating c*, a* and b* values in accordance the L*a*b* color space representation and the selected component;
means adapted for calculating bi-chromatic L*a*b* color space representation in accordance with L* values, c* values and the selected component; and
means adapted for converting calculated bi-chromatic L*a*b* color representation to bi-chromatic data defined in a color space compatible with the associated document rendering device.

6. A method for bi-chromatic document rendering comprising the steps of:
receiving electronic document data defining an image, which electronic document data includes color data having values defined in a selected, multidimensional color space, the color data including luminance data and saturation data;
mapping color data to a selected color component of the multidimensional color space so as to generate bi-chromatic data corresponding to a bi-chromatic representation of the image, which bi-chromatic representation includes a black component and a single significant, non-black hue component, and which bi-chromatic representation substantially maintains the luminance data and saturation data of the received electronic document data, the mapping including,
receiving angle data corresponding to an angle,
calculating updated saturation data in accordance with received angle data,
calculating hue value data in accordance with the non-black hue component and the received angle data, and
generating the bi-chromatic data in accordance with the updated saturation data, the hue value, and the luminance data; and
communicating generated bi-chromatic data to an associated document rendering device.

7. The method for bi-chromatic document rendering of claim 6 further comprising the step of receiving data identifying the selected color.

8. The method for bi-chromatic document rendering of claim 7 wherein the step of mapping includes mapping color data to the selected color component relative to a selected offset value there between.

9. The method for bi-chromatic document rendering of claim 8 further comprising the step of converting of bi-chromatic data from a first color space to a second color space prior to being output to the associated document rendering device.

10. The method for bi-chromatic document rendering of claim 8 wherein the step of mapping further includes:
converting electronic document data from a RGB color space representation to a L*a*b* color space representation;
calculating c*, a* and b* values in accordance the L*a*b* color space representation and the selected component;
calculating bi-chromatic L*a*b* color space representation in accordance with L* values, c* values and the selected component; and
converting calculated bi-chromatic L*a*b* color representation to bi-chromatic data defined in a color space compatible with the associated document rendering device.

11. A computer-implemented method for bi-chromatic document rendering comprising the steps of:
receiving electronic document data defining an image, which electronic document data includes color data having values defined in a selected, multidimensional color space, the color data including luminance data and saturation data;
mapping color data to a selected color component of the multidimensional color space so as to generate bi-chromatic data corresponding to a bi-chromatic representation of the image, which bi-chromatic representation includes a black component and a single significant, non-black hue component, and which bi-chromatic representation substantially maintains the luminance data and saturation data of the received electronic document data, the mapping including,
receiving angle data corresponding to an angle,
calculating updated saturation data in accordance with received angle data,
calculating hue value data in accordance with the non-black hue component and the received angle data, and
generating the bi-chromatic data in accordance with the updated saturation data, the hue value, and the luminance data; and
communicating generated bi-chromatic data to an associated document rendering device.

12. The computer-implemented method for bi-chromatic document rendering of claim 11 further comprising the step of receiving data identifying the selected color.

13. The computer-implemented method for bi-chromatic document rendering of claim 12 wherein the step of mapping includes mapping color data to the selected color component relative to a selected offset value there between.

14. The computer-implemented method for bi-chromatic document rendering of claim 13 further comprising the step of converting of bi-chromatic data from a first color space to a second color space prior to being output to the associated document rendering device.

15. The computer-implemented method for bi-chromatic document rendering of claim 13 wherein the step of mapping further includes:
converting electronic document data from a RGB color space representation to a L*a*b* color space representation;
calculating c*, a* and b* values in accordance the L*a*b* color space representation and the selected component;
calculating bi-chromatic L*a*b* color space representation in accordance with L* values, c* values and the selected component; and
converting calculated bi-chromatic L*a*b* color representation to bi-chromatic data defined in a color space compatible with the associated document rendering device.

* * * * *